United States Patent

[11] 3,585,839

| [72] | Inventor | Stephen A. Bollinger<br>1452 La Habra Drive, Lake San Marco, Calif. 92069 |
|---|---|---|
| [21] | Appl. No. | 748,063 |
| [22] | Filed | July 26, 1968 |
| [45] | Patented | June 22, 1971 |

[54] METHOD AND APPARATUS FOR CALIBRATING THERMOMETERS AND THE LIKE
13 Claims, 3 Drawing Figs.

| [52] | U.S. Cl. | 73/1 |
|---|---|---|
| [51] | Int. Cl. | G01k 15/00 |
| [50] | Field of Search | 73/1 F, 1 A, 371; 65/62; 101/44 |

[56] References Cited
UNITED STATES PATENTS

| 1,391,878 | 9/1921 | Chaney | 73/1(F) |
|---|---|---|---|
| 2,419,487 | 4/1947 | Dresser | 73/432UX |
| 2,706,761 | 4/1955 | Douglas | 73/371 |
| 3,141,322 | 7/1964 | Himelsbaugh | 73/1(F) |

*Primary Examiner*—S. Clement Swisher
*Attorney*—Sellers and Brace

ABSTRACT: An apparatus and method for printing indicia on thermometers. The thermometers are maintained at a predetermined temperature and sequentially advanced to a station where the photoelectric means is employed to the position of the indicating fluid within the thermometer. In response to the determination the scale is printed on the tubular thermometer in the appropriate relationship.

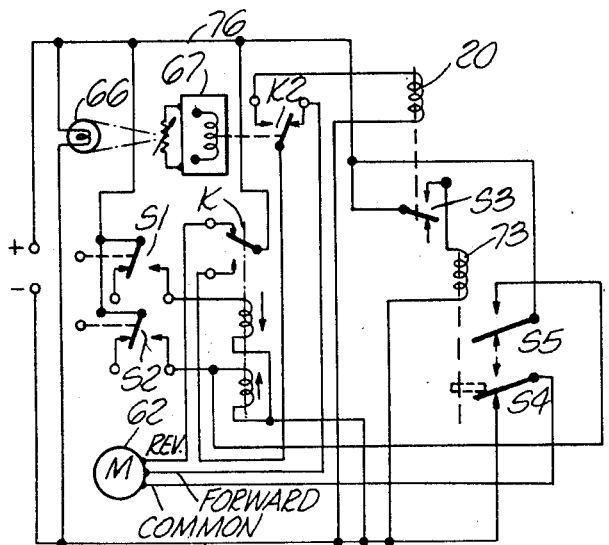
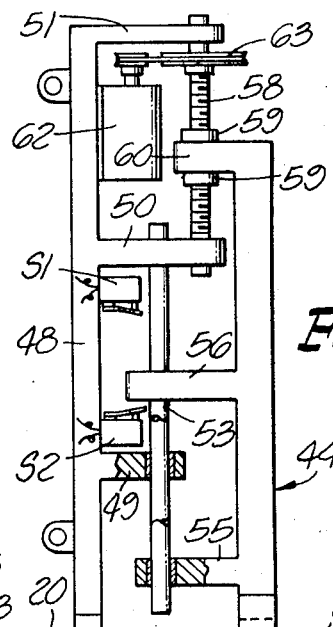
FIG. 1.
FIG. 3.
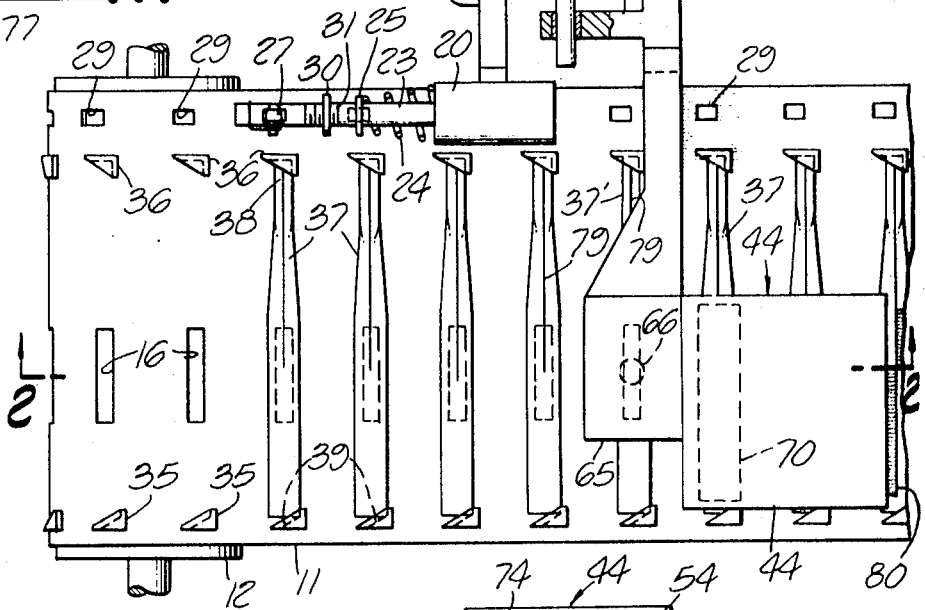
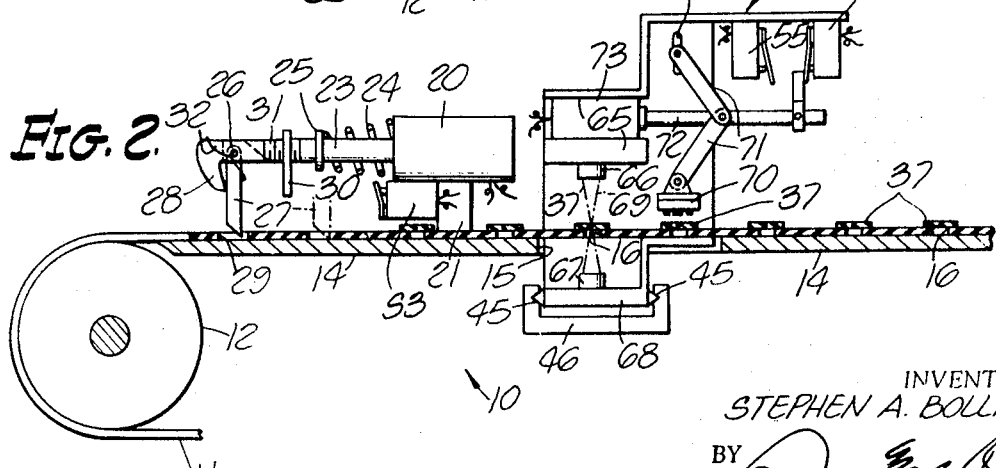
FIG. 2.
INVENTOR.
STEPHEN A. BOLLINGER
BY
ATTORNEYS

METHOD AND APPARATUS FOR CALIBRATING THERMOMETERS AND THE LIKE

This invention relates to an apparatus and a method for providing tubular members such as thermometers with indicia, as for example, a calibration scale coordinated with the characteristics of a thermally sensitive fluid present in the thermometer and with a particular point on the scale accurately positioned opposite one end of the column. The invention provides an automatically controlled means and method for advancing a plurality of similar items to be calibrated, as thermometers, under a particular highly stabilized temperature condition, in succession past a scanning station, there locating with precision the end of the fluid column followed by placement of a scale upon the exterior of the object being calibrated and in a precise position determined by the position of one end of the liquid column. Means are provided for transporting the objects in succession past the scanning and marking station and for repeating the scanning and scale-marking operation in repetitive cycles and in predetermined time delay sequence. The scanning station utilizes photoelectric sensing means mounted on a carriage movable lengthwise of the member or instrument being calibrated. The automatic control includes means for returning the scanner and indicia marker in unison to a predetermined starting position known to be beyond the position of the column end to be sensed, and then advances the sensor along the column until the light beam locates the end of the column. The scanner then stops and the conveyor is advanced one increment to advance the next thermometer into scanning position and the previous thermometer into marking position where it is provided with an appropriate scale. Thereafter the scanner is returned to its starting position for commencement of the next scanning and marking cycle.

Techniques heretofore proposed for calibrating thermometers and the like involve a number of steps and procedures carried out by hand or by the aid of hand-controlled equipment. These techniques are time consuming, laborious and customarily involve "pointing" the individual thermometers at one or more points along their lengths after the thermometers have been stabilized at different temperature levels. Thereafter, these pointings are employed as a guide in distributing the other scale indicia along the body of the thermometer and between the previously located "points."

The present invention proposes an automatically performed calibrating technique utilizing thermometers formed with identical capillary bores communicating at one end with identical reservoirs charged with a temperature sensitive fluid. Owing to the identical and uniform size of the reservoirs and capillaries the stabilized thermometers may be uniformly distributed along a conveyor and advanced past a scanning station equipped to locate the end of the fluid column in each with precision while the thermometers are maintained stabilized at a selected midrange temperature. Once the end of the column is located the individual thermometer is marked with indicia by means rigidly secured to and movable with the scanning device and with the preselected stabilized temperature indicia located directly opposite the end of the temperature sensitive column. The next scanning operation then proceeds with the next thermometer then in position for scanning. The entire operation is carried out under automatic control and without need for attention except by supervisory personnel.

It is therefore a principal object of the invention to provide a cyclically controlled method and apparatus for sequentially locating the end of a fluid column in a generally tubular member and then marking this member with appropriate indicia or a scale.

Another object of the invention is the provision of an automatically controlled method and apparatus for conveying members charged with a thermally responsive fluid past a scanning station and there locating the end of the fluid column and marking the exterior of the member with a scale in a location accurately determined by the scanning means.

Another object of the invention is the provision of a calibrating technique for precision thermometers utilizing photoelectric means for the precise location of the end of the thermally responsive column under a preselected stabilized temperature condition and then marking the thermometer with a scale such that indicia representative of the predetermined stabilized temperature condition is located directly opposite the end of the column.

These and other more specific objects will appear upon reading the following specification and claims and upon considering in connection therewith the attached drawing to which they relate.

Referring now to the drawing in which a preferred embodiment of the invention is illustrated:

FIG. 1 is an elevational view of the upper end of an automatic calibrating apparatus as designed for use to calibrate thermometers in accordance with the principles of this invention, parts being broken away to show details of the construction;

FIG. 2 is a cross-sectional view taken generally along line 2–2 on FIG. 1 and showing details of the apparatus; and FIG. 3 is a schematic of the automatic control circuit for the calibrating apparatus.

Referring now more particularly to FIGS. 1 and 2, there is shown an illustrative embodiment of apparatus, designated generally 10, suitable for use in practicing the principles of this invention. This apparatus includes a suitable conveyor having a thin flexible belt 11 supported under tension by rollers 12, only one of which is shown. It will be understood that the conveyor is preferably sharply inclined to the vertical with the left-hand end, FIG. 2, uppermost. One run of this belt is firmly supported by an underlying plate 14 having an opening 15 at the scanning station. Belt 11 is also preferably provided with openings 16 positioned to underlie the central main body portions of the thermometers being calibrated in order that the intensity of the scanning light beam will not be diminished by having to pass through the transparent material of the conveyor belt.

Any suitable means may be provided for advancing the conveyor belt in precise increments during the calibration cycle for each thermometer. One suitable means for driving the conveyor is here shown by way of example as comprising a solenoid 20 mounted on a fixed support 21 carried by the apparatus frame. Armature 23 of this solenoid is normally urged to its extended position shown in FIG. 2 as by a spring 24 the outer end of which bears against a flange 25 on armature 23. A dog 27 is pivotally supported by pin 26 in a slot formed in the outer end of armature 23. A torsion spring 32 encircles the protruding end of pin 26 and urges dog 27 clockwise against a stop 28 formed on the left-hand end of armature 23. The beveled lower end of the dog 27 normally extends into one of a series of openings 29 formed along the edge of the conveyor belt in readiness to index the conveyor to the right when solenoid 20 is energized. It will be understood that bosses projecting upwardly from the outer surface of the belt may be engaged by dog 27 and used in lieu of the openings 29. These openings or bosses are so located that dog 27 will swing counterclockwise about pivot 26 during the retraction or return movement of the armature by spring 24 and then drop into an underlying notch 29 as shown in FIG. 2 in readiness to advance the conveyor by a predetermined indexing increment when solenoid 20 is next energized.

Desirably, the stroke of the solenoid is adjustable to a precise degree as by a stop 30 carried by the armature and rotatable along threads 31 thereon to any desired position. Alternatively, stop 30 may be fixed to the armature and carry an adjustable stop screw in its lower end positioned to actuate the operator 33 of microswitch S3 of the automatic control circuit.

Conveyor belt 11 is also provided with suitable receptacles 35, 36 in alignment with one another crosswise of belt 11. Each receptacle is contoured to engage over the adjacent end of a thermometer 37 to be calibrated. As here shown, the reservoir end 38 of the thermometer is located in socket 36 whereas the main body or stem end of the thermometer seats against the inclined inner end wall of retaining receptacle 35. This bevel serves to cam the individual thermometers lengthwise with the reservoir end seated firmly against the interior end wall of socket 36. It will be understood that the left hand or upper end of the conveyor is preferably supported vertically or at a steep incline so that gravity is effective in cooperation with the inclined end surfaces 39 of sockets 35 to support the thermometers firmly and uniformly in the position shown in FIG. 1. It will also be recognized that spring clips or other types of holders may be provided in lieu of receptacles 35, 36 to hold the individual thermometers firmly and accurately positioned for scanning the liquid column by the electric eye and for marking the thermometer stems with indicia once the end of the column has been accurately ascertained.

The molded plastic thermometer disclosed in the copending application for Letters Patent Ser. No. 426,721, filed Jan. 21, 1965, by Lee Le Beau, is particularly suited for calibration by this invention because of the uniformity and identical natures of their reservoirs and capillary passages.

The scanning and marking components of the invention apparatus are mounted on a rigid frame 44 suitably supported for to-and-fro reciprocal motion crosswise of the conveyor belt and lengthwise of the individual thermometers supported thereon. Referring to FIG. 2, it will be noted that frame 44 includes V-shaped ribs slidable lengthwise of guide channels 45 (FIG. 2) formed lengthwise of the interior sidewalls of a stationary channel-shaped member 46 located between the runs of conveyor belt 11. Member 46 may be suitably anchored to the main frame 48 laterally of one edge of the conveyor.

This main frame is provided with three transverse brackets 49, 50, 51 (FIG. 1) to support components for reciprocating the scanner and the indicia marker. Rigidly secured within brackets 49, 50 are one and preferably a pair of parallel guide rods 53 lying parallel to the guide rails 45, 45. Rods 53, 53 have a close sliding fit with bearings carried in brackets 55, 56 of frame 44 so that the latter is slidable to-and-fro lengthwise along rods 53.

Suitable means for reciprocating frame 44 lengthwise of the thermometers being calibrated comprises a precision preloaded ball bearing nut and screw mechanism comprising a screw 58 and a pair of ball bearing nuts 59, 59 forcibly rotated in opposite directions against the adjacent sides of a bracket 60 carried by frame 44 thereby to preload the balls in the closed circuit of each nut to remove all backlash and deformation caused by load forces. Such a mechanism has extremely low friction and is free of lost motion or error. The details of such mechanisms are well known, a preferred construction being that shown in U.S. Pat. No. 2,982,145 granted to Harry Orner on May 2, 1961. The opposite ends of drive screw 58 are mounted in suitable thrust ball bearings carried by brackets 50 and 51, respectively, of frame 48, a suitable arrangement being that shown in the above-mentioned Orner patent. From the foregoing, it will be understood that reciprocation of frame 44 is obtained by rotating screw 58 in one direction or the other relative to the nonrotating preloaded ball bearing nut 59, 59. For this purpose screw 58 is rotated by a reversible motor 62 rigidly supported on frame 48 and suitable pulleys and a nonslipping belt 63, it being understood that the motor operates through reducing gears and is capable of stopping abruptly with precision and without overrun.

The end of frame 44 remote from feed screw 58 is bifurcated with the legs thereof lying parallel to one another and straddling the conveyor belt run carrying the thermometers. Rigidly secured to the outer one leg 65 of the legs is a light source 66 of a photoelectric scanning mechanism having a photoelectric cell 67 secured to the second leg 68 of the bifurcated end of frame 44. Photoelectric cell 67 is in axial alignment with light source 66 which will be understood as including focusing means bringing the light beam 69 into sharp focus in the plane of the liquid column in the thermometer undergoing scanning. Since the scanning apparatus is moved to-and-fro lengthwise of the liquid column it will be apparent that the light beam is blocked thereby until reaching the end of the column whereupon the beam strikes eye 67 and activates the circuit controlled thereby instantly and with precision to deenergize motor 62.

The means for placing the indicia on the thermometer in the location selected by the scanning mechanism comprises a stamping element 70 (FIG. 2) held normally retracted slightly above the thermometer body and bearing the scale indicia. Member 70 is supported for limited vertical movement by parallel pairs of toggle links 71, only one pair of which is shown, having their adjacent ends pivotally connected to armature 72 of a solenoid assembly 73 rigidly secured to frame 44. Armature 72 is spring biased to its extended position wherein the stamp is retracted from a thermometer. Upon being energized, the solenoid coil attracts armature 72 to the left causing links 71 to straighten along vertical slideways 74 carried by frame 44 thereby depressing the indicia-carrying member 70 forcibly against the main body of the underlying thermometer which is firmly supported by a portion of frame 44 underlying the conveyor belt. When the solenoid is deenergized, the spring returns the armature to its retracted position and lifts member 70 to the position illustrated in FIG. 2.

THE CONTROL CIRCUIT

Referring now to FIG. 3, there is shown a wiring schematic for operating all components of the calibrating apparatus sequentially through repetitive cycles. The position of all parts of the circuit are shown as they exist immediately following placement of a scale on a thermometer 37 beneath indicia printer 70, FIG. 2. At this time, frame 44 carrying the photoelectric scanner and the indicia imprinter must be retracted to its starting position for a searching operation on thermometer 37' then in scanning position.

Before describing the control circuit and its operation in detail it will be pointed out that photoelectric scanner 67 is of a well known type having a double contact relay K2 which operates in known manner to close to the left whenever the light beam from light source 66 impinges upon its light sensitive sensor, such as the thermister 75. Microswitches S1, S2, S3 and S5 are normally open and must be closed by the application of pressure and open immediately that this pressure is released. Switch S2 is a safety switch which operates to deactivate the control circuit should the scanner fail to find the end of the liquid column or the column is out of position. Relay K is a magnetic latching relay having separate coils the upper one of which operates to close the contact downwardly when energized momentarily and the lower one of which operates to close the contact upwardly in response to momentary energization. The armatures of solenoids 20 and 73 are normally biased to their extended positions and operate when energized to pull the associated armature inwardly against the biasing spring. Each may be and preferably is designed for slight delay response when energized.

Assuming now that the power supply leads 76, 77 are energized from any suitable DC source, the circuit will be understood as operating as follows: As soon as printer solenoid 73 retracts, it closes switch S4 and energizes motor 62 through relay K to drive screw 58 in a direction to return frame 44 to its retracted position. Motor 62 continues to operate until bracket 56 of frame 44 (FIG. 1) closes switch S1 and energizes the upper coil of relay K thereby opening its upper contact to deenergize motor 62. The downward closing of the lower contact of relay K completes a power circuit through the motor to drive it in its forward direction, the power supply being from bus 76 through relay K2 to motor 62 and to the negative bus 77 by way of switch S4 held closed by the spring acting on the armature of solenoid 73. The circuit is now conditioned for the liquid column scanning operation and relay K2 controlled by the electric eye sensor 75 is closed to the right as shown because the liquid column acts as a barrier to the light beam from light 66. The light beam from lamp 66 now moves along liquid column 79 of thermometer 37'. Instantly that the slowly advancing scanner reaches the end of the liquid column, the light beam strikes sensor 75, energizing relay K2 thereby opening its right hand contact to deactivate relay K2 drive motor 62 and completing a power circuit through the downwardly closed contact of relay K to solenoid 20. Solenoid 20 then advances the upper run of conveyor 11 as viewed in FIG. 2 to the right, indexing thermometer 37' to a marking position directly beneath the scale-marking member 70. A single momentary operating pulse to solenoid 20 suffices to activate it through a complete stroke wherein dog 27 carried by its armature and engaged in the underlying notch 29 of the conveyor advances the conveyor through a single operating increment and until member 30 carried on its armature closes switch S3. When switch S3 closes, power is fed from bus 76 through solenoid 73 to operate the scale imprinter 70. A single pulse of energy suffices to operate this solenoid, the initial movement of its armature opening normally closed switch S4 and momentarily thereafter closing switch S5 to energize the lower coil of latching relay K thereby closing the upper contact of this relay and arming the circuit for the next scanning cycle. While this operation is going on the indicia carried on the printing member 70 is forcibly lowered against the underlying thermometer 37 to imprint the scale 80 on the thermometer body with a preselected point on the scale accurately and precisely positioned opposite the end of the liquid column, this position having been determined by the photoelectric scanner 67 in the manner just described.

Return of the armature solenoid 73 to its retracted position closes switch S4 thereby energizing motor 62 in the reverse direction by power supplied through the upwardly closed contact of latching relay K. During the return movement of the scanning frame to its starting position the light beam from light source 66 is cut off by the liquid column in thermometer 37' next to be scanned. For this reason, photoelectric controlled relay K2 is closed to the right in readiness to start the motor in its forward direction. However, this operation cannot start until the printer is fully retracted and S4 has been reclosed.

It will be understood that the operation herein described is carried out while the thermometers undergoing calibration are maintained precisely at a predetermined stabilized temperature preferably selected to lie in the midrange of the temperatures to be measured. This may be done in various ways well known to those skilled in this art, such as by enclosing the equipment and a large supply of the thermometers to be calibrated in a chamber maintained by automatic temperature control at the desired temperature. Alternatively, the conveyor may be arranged to advance the reservoir ends of the thermometers in a liquid bath maintained at the selected temperature.

Although the present invention has been disclosed as arranged to advance the light beam along the liquid column in search of its end, it will be understood that the circuit can be revised to operate to initiate the next steps in the calibrating cycle by advancing the light beam from the closed upper end of the thermometer toward the end of the liquid column, and to activate the marking and indexing steps when the scanner finds the end of this column.

While the particular method and apparatus for calibrating thermometers and the like herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of providing a transparent tubular member partially charged with a column of liquid with a scale for determining the position of the column which comprises: automatically advancing a plurality of said tubular members in succession to an inspection station, employing electrically responsive sensor means to scan an individual tubular member when in position at said inspection station to determine the position of one end of the liquid column lengthwise of said member, and placing a scale upon the exterior of each tubular member with a predetermined reference point on the scale directly opposite the end of said liquid column.

2. That method defined in claim 1 characterized in the step of utilizing a light beam in combination with photoelectric detector means to perform said scanning step.

3. That method defined in claim 1 characterized in the step of carrying out successive scanning and scale-placing operations automatically in predetermined timed sequence.

4. That method defined in claim 1 characterized in the step of stabilizing the temperature of said tubular members and the liquid contents thereof at a predetermined temperature preselected to correspond with the location of the predetermined reference point for the placement of said scale.

5. That method defined in claim 1 characterized in the step of beginning successive ones of said scanning operations from a predetermined starting position known to be normally spaced from the end of liquid column despite variations in manufacturing tolerances between a multiplicity of said tubular members.

6. That method defined in claim 1 characterized in that the step of placing the scale on said tubular members is performed by imprinting, and initiating said imprinting operation automatically upon determination of said predetermined reference point.

7. That method defined in claim 6 characterized in that said scale imprinting step is performed in time-delayed sequence and as the next tubular member is being positioned for scanning.

8. That method defined in claim 1 characterized in that said tubular members comprise sealed thermometers charged with a temperature sensitive fluid and includes the steps of orienting said thermometers in predetermined uniformly spaced relation, and indexing said thermometers individually to said scanning operation followed by dwell periods between said steps long enough to complete a scanning operation of maximum length.

9. That method defined in claim 8 characterized in the step of mounting said thermometers in parallelism on conveyor means formed with openings therethrough in general registry with the end portion of the column of thermally sensitive fluid.

10. Automatic apparatus for calibrating thermometers charged with a colored thermally sensitive fluid comprising, conveyor means provided with means for supporting a plurality of closely spaced thermometers arranged parallel to one another, means providing a scanning station equipped with scanning means movable lengthwise of a thermometer column in scanning position at said scanning station and including means operable to place a temperature scale on the thermometer with a predetermined graduation of the scale directly opposite the end of the column of thermally sensitive fluid in response to the location of the column end by said scanning means, and means for repeating the aforementioned operating cycle in rapid succession.

11. Automatic apparatus as defined in claim 10 characterized in that said conveyor means has openings throughout opposite the position of the top of the fluid columns in the thermometers carried thereby past said scanning station.

12. Automatic apparatus as defined in claim 10 characterized in that said scanning station means includes ball bearing screw means for moving the same to-and-fro lengthwise of said thermometers, and reversible motor drive means for rotating said ball bearing screw means selectively in opposite directions to scan said thermometers to locate the top of said column of thermally sensitive fluid.

13. Automatic apparatus as defined in claim 10 characterized in that said scanning means comprises a main support, frame means supported for linear movement to-and-fro relative to said main support and including preloaded ball bearing screw and nut mechanism interconnecting said frame means and said main support, reversible motor means connected to ball bearing screw and nut mechanism to drive said frame means in either direction without lost motion, photoelectric scanning means mounted on said frame means for to-and-fro movement therewith, and control means for said photoelectric scanning means connected in circuit with reversible motor means and operable to control the operation of said motor means in response to a change in the object scanned as sensed by said photoelectric means.